US011847012B2

United States Patent
Cormack et al.

(10) Patent No.: US 11,847,012 B2
(45) Date of Patent: Dec. 19, 2023

(54) METHOD AND APPARATUS TO PROVIDE AN IMPROVED FAIL-SAFE SYSTEM FOR CRITICAL AND NON-CRITICAL WORKLOADS OF A COMPUTER-ASSISTED OR AUTONOMOUS DRIVING VEHICLE

(71) Applicant: Intel Corporation, Santa Clara, CA (US)

(72) Inventors: Christopher Cormack, Portland, OR (US); Matthew Curfman, Hillsboro, OR (US); Sebastien Hily, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 341 days.

(21) Appl. No.: 16/821,733

(22) Filed: Mar. 17, 2020

(65) Prior Publication Data

US 2020/0278897 A1    Sep. 3, 2020

Related U.S. Application Data

(60) Provisional application No. 62/868,682, filed on Jun. 28, 2019.

(51) Int. Cl.
*G06F 11/07* (2006.01)
*G06F 11/34* (2006.01)
(Continued)

(52) U.S. Cl.
CPC ........ *G06F 11/0709* (2013.01); *B60R 16/023* (2013.01); *G06F 9/4881* (2013.01);
(Continued)

(58) Field of Classification Search
CPC .. G06F 11/0709; G06F 9/4881; G06F 9/5005; G06F 11/3433; G06F 11/143;
(Continued)

(56) References Cited

U.S. PATENT DOCUMENTS

| 2003/0126240 | A1* | 7/2003 | Vosseler | G06F 11/2025 |
| | | | | 714/E11.073 |
| 2005/0100141 | A1* | 5/2005 | Otagaki | H04M 1/2745 |
| | | | | 379/88.01 |

(Continued)

OTHER PUBLICATIONS

"System on a Chip" (https://en.wikipedia.org/wiki/System_on_a_chip), available Apr. 17, 2018 (Year: 2018).*

*Primary Examiner* — Michael W Ayers
(74) *Attorney, Agent, or Firm* — Schwabe, Williamson & Wyatt, P.C.

(57) ABSTRACT

Apparatuses, methods and storage medium associated with embedded computing, are disclosed herein. In embodiments, an embedded computing platform includes a plurality of system-on-chips (SoCs) forming a local compute cluster; and an orchestrator disposed on one of the SoCs arranged to orchestrate fail-safe operations, in response to a reported unrecoverable failure requiring shut down or partial disabling of one of the SoCs, to consolidate execution of critical workloads on one or more of remaining fully or partially operational ones of the SoCs. Other embodiments are also described and claimed.

24 Claims, 9 Drawing Sheets

(51) Int. Cl.
*B60R 16/023* (2006.01)
*G06F 9/50* (2006.01)
*G06N 3/063* (2023.01)
*G06F 9/48* (2006.01)

(52) U.S. Cl.
CPC ........ *G06F 9/5005* (2013.01); *G06F 11/3433* (2013.01); *G06N 3/063* (2013.01)

(58) Field of Classification Search
CPC ............. G06F 11/3024; G06F 11/3055; G06F 11/3409; B60R 16/023; G06N 3/063
See application file for complete search history.

(56) References Cited

U.S. PATENT DOCUMENTS

| | | | | |
|---|---|---|---|---|
| 2006/0167966 | A1* | 7/2006 | Kumar | G06F 9/5083 709/201 |
| 2008/0253283 | A1* | 10/2008 | Douglis | G06F 11/1482 370/228 |
| 2009/0077246 | A1* | 3/2009 | Lee | H04N 7/17336 709/229 |
| 2009/0276781 | A1* | 11/2009 | Chan | G06F 9/4881 718/103 |
| 2012/0072765 | A1* | 3/2012 | Bower, III | G06F 11/2035 714/E11.071 |
| 2013/0198737 | A1* | 8/2013 | Ricci | B60R 25/01 717/174 |
| 2014/0040474 | A1* | 2/2014 | Blagodurov | H04L 47/726 709/226 |
| 2014/0181573 | A1* | 6/2014 | Goss | H04L 45/021 710/305 |
| 2015/0100817 | A1* | 4/2015 | Alshinnawi | G06F 11/004 714/3 |
| 2016/0050123 | A1* | 2/2016 | Nishanov | H04L 67/10 709/223 |
| 2016/0050294 | A1* | 2/2016 | Kruse | H04L 69/40 709/201 |
| 2016/0211369 | A1* | 7/2016 | Jan | H01L 29/7827 |
| 2016/0283261 | A1* | 9/2016 | Nakatsu | G06F 9/45558 |
| 2016/0328272 | A1* | 11/2016 | Ahmed | G06F 9/4881 |
| 2019/0132611 | A1* | 5/2019 | Matsubara | H04N 19/503 |
| 2020/0034156 | A1* | 1/2020 | Chuppala | G06F 9/44505 |
| 2020/0089526 | A1* | 3/2020 | Enguehard | G06F 9/45558 |
| 2020/0285524 | A1* | 9/2020 | Patil | G06F 9/5072 |
| 2022/0019396 | A1* | 1/2022 | Choi | B60W 50/14 |
| 2022/0150122 | A1* | 5/2022 | Suwi | H04L 41/0873 |

* cited by examiner

METHOD AND APPARATUS TO PROVIDE AN IMPROVED FAIL-SAFE SYSTEM FOR CRITICAL AND NON-CRITICAL WORKLOADS OF A COMPUTER-ASSISTED OR AUTONOMOUS DRIVING VEHICLE

RELATED APPLICATIONS

This application a non-provisional application of provisional application 62/868,682, entitled "METHOD AND APPARATUS TO PROVIDE AN IMPROVED FAIL-SAFE SYSTEM FOR AUTOMOBILES, BY CLASSIFYING AND PRIORITIZING WORKLOADS ACROSS A LOCAL COMPUTE CLUSTER," filed Jun. 28, 2019, and claims priority to the provisional application. The Specification of provisional application 62/868,682 is hereby fully incorporated by references.

TECHNICAL FIELD

The present disclosure relates to the fields of embedded computing abd computer-assisted or autonomous driving (CA/AD). More particularly, the present disclosure relates to method and apparatus to provide an improved fail-safe system for automobiles, by classifying and prioritizing workloads across a local compute cluster, having particular application to software defined cockpit (e.g. automotive electronic control unit consolidation, in vehicle systems, and driver monitoring).

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Embedded solutions, specifically automotive, often have critical or even safety critical software that executes on the platform. In these cases, it is often required to have a fail-safe mode of operation, where upon a partial system failure, critical and/or safety critical software still executes in either a full or limited scope.

The only previous solutions to this problem fundamentally rely on single SoC solutions that are inherently highest quality silicon or expensive solutions utilizing multiple SoC configured for redundancy. Generally, this means only solving this problem via traditional expensive methods:

Automotive grade silicon (temperature, vibration, etc.). Consumer grade silicon is traditionally designed to operate in an ambient temperature range of 0 C to 45 C, whereas automotive grade silicon is designed to operate in temperature range of −40 C to 85 C.

Low DPM silicon (defects-per-million). Typical consumer grade silicon targets between 500-1000 DPM, whereas automotive grade silicon targets for <10 DPM Accordingly, prior solutions can only handle partial SoC failures that are non-catastrophic (single core failure, etc.). Further, overall, prior solutions are less-scalable (architecture relies on single SoC for scalability, not cluster).

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
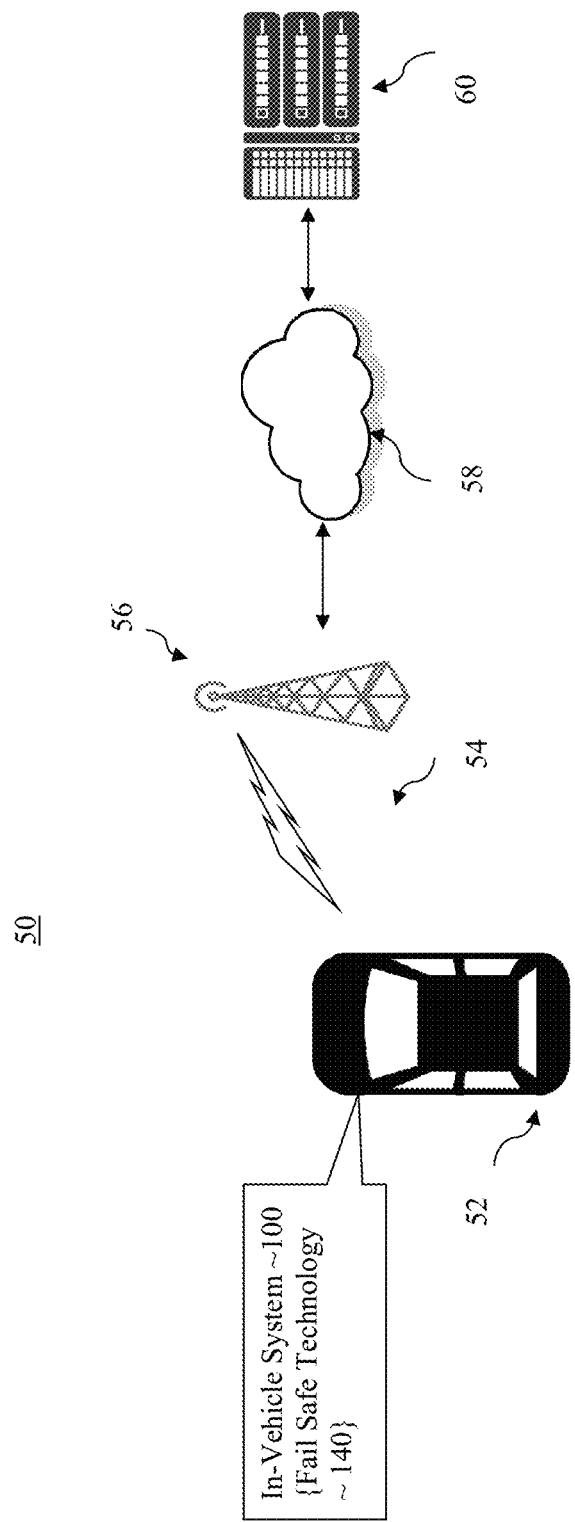
FIG. 1 illustrates an overview of an environment for incorporating and using the fail-safe technology of the present disclosure, in accordance with various embodiments.

The present disclosure presents a solution for embedded applications that takes advantage of the utilization of multiple compute nodes (System-on-Chips (SoCs), etc.) operating in a local compute cluster as well as an application orchestration solution to provide a robust method to ensure that a prioritized set of critical applications are enabled to execute when a portion of the local compute cluster fails.

The present disclosure utilizes the combination of hardware redundancy, software orchestration, and application prioritization to provide a significantly improved fail-safe architecture for an automobile. This model utilizes a "local compute cluster" for two purposes: a) generalized system scalability when the nodes are all properly working b) high availability through redundant hardware that can execute prioritized critical software if and when any node (or part of a node) in the local compute cluster fails.

An example usage of this technology in the automotive segment might be ensuring that a basic (not fully featured) instrument cluster (IC) is rendered to the IC display even if the central processing unit or graphics processing unit (CPU/GPU) that the IC is running on fails. In this case, an orchestration system would de-prioritize or disable a lower priority application (e.g., a rear seat game being played by a passenger), migrate (e.g., hot swap) the IC to another node in the local compute cluster, and display an indicator light (e.g., a system error indicator light) within the IC. The driver of the vehicle is therefore alerted to the system failure (e.g., by the system error indicator light/instrument telltale), may see an instantaneous interruption in the IC visually, see the IC recover, and be enabled to safely continue driving to a repair shop without being forced to pull over and tow the vehicle.

In some embodiments, the orchestration system may assess if enough performance is available on the other node for the local mission critical tasks to run, eventually disable lower priority tasks on the other node to free performance, migrate the mission critical task to the other node, then disable the local node. In other embodiments, the orchestration system could assess if the local node can still support the mission critical tasks despite its failing unit (still has the necessary hardware resources), eventually disable a lower priority tasks, then disable the failing unit but continue to run on the local node. To enable a fast transition, mission critical tasks could run on both nodes, one node supporting a full and rich experience version, the other supporting a minimal experience. Migration of the task would then not be necessary, just a switch.

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1, wherein an overview of an environment for incorporating and using the fail-safe technology of the present disclosure, in accordance with various embodiments, is shown. As illustrated, in embodiments, example environment 50 includes vehicle 52 having an engine, transmission, axles, wheels and so forth. Further, vehicle 52 includes in-vehicle system (IVS) 100 having computing hardware elements forming one or more local compute clusters (including accelerate compute elements), and a number of subsystems/applications. Examples of subsystems/applications may include critical subsystems/applications, such as instrument cluster sub system/application, and non-critical sub systems/applications, such as front-seat infotainment sub system/application, a navigation sub system/application, a media sub system/application, a vehicle status sub system/application, a number of rear seat entertainment sub systems/applications, and so forth. Further, IVS 100 is provided with the fail-safe technology 140 of the present disclosure, allowing subsystems/applications (workloads) to be classified and/or prioritized across a local compute cluster.

In embodiments, IVS system 100, on its own or in response to the user interactions, may communicate or interact with one or more off-vehicle remote content servers 60, via a wireless signal repeater or base station on transmission tower 56 near vehicle 52, and one or more private and/or public wired and/or wireless networks 58. Examples of private and/or public wired and/or wireless networks 58 may include the Internet, the network of a cellular service provider (including Cellular Vehicle-to-Everything (C-V2x), and so forth. It is to be understood that transmission tower 56 may be different towers at different times/locations, as vehicle 52 en routes to its destination. In other embodiments, IVS system 100, on its own or in response to the user interactions, may communicate or interact with one or more proximately located road side units (RSU) or other vehicles (not shown), using short range wireless communications, e.g., Dedicated Short Range Communications (DSRC).

Figure 2:
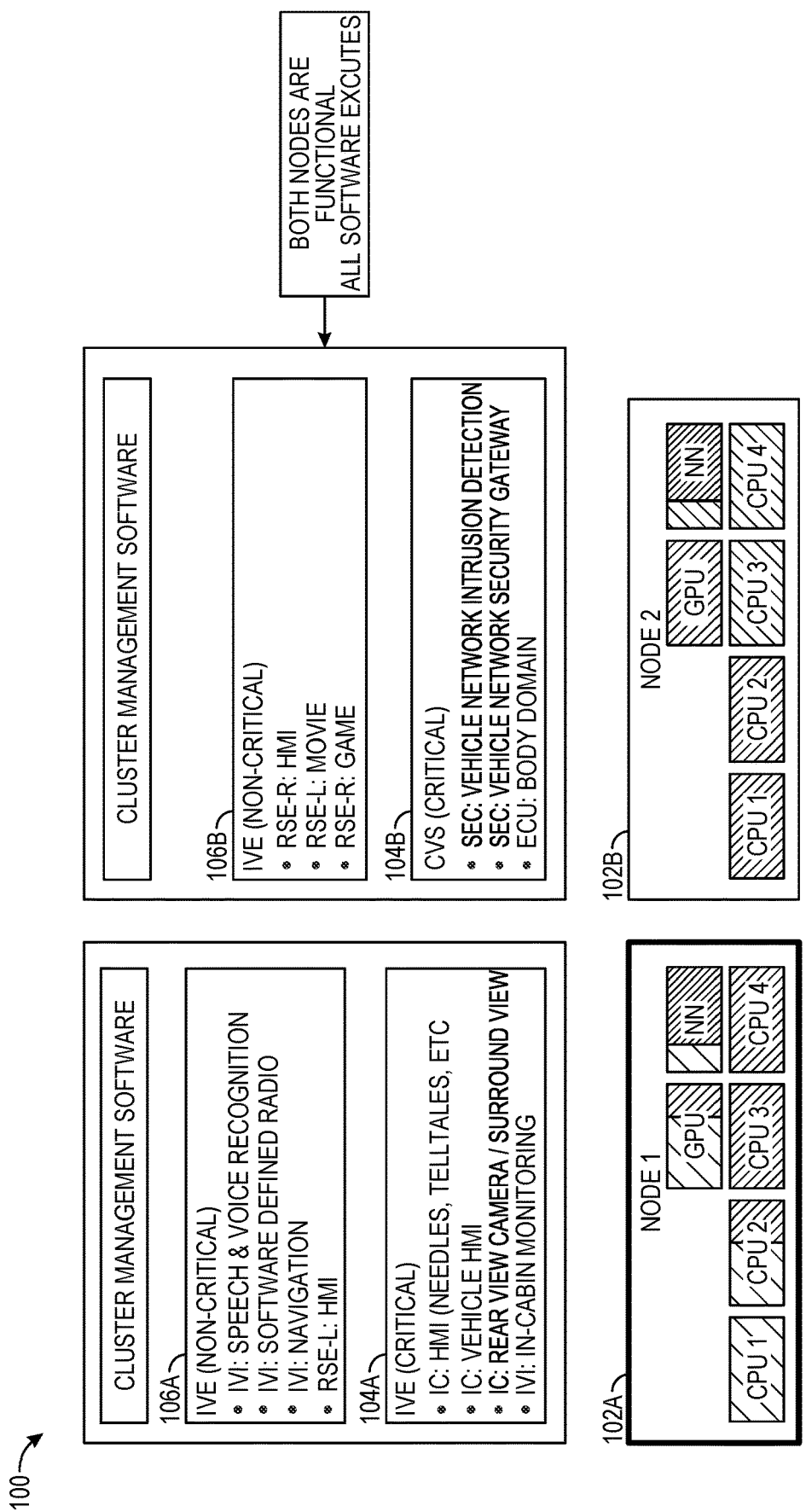
FIG. 2 illustrates normal operations of the example in-vehicle system of FIG. 1 with all nodes functional and all software executing, according to various embodiments.

Referring now FIG. 2, wherein normal operations of the example in-vehicle system of FIG. 1 with all nodes functional and all software executing, according to various embodiments, are illustrated. As shown, for the illustrated embodiments, example IVS 100 includes two compute nodes 102a and 102b (collectively also referred to as a local computer cluster). Each node, in term of compute resources, includes four (4) CPUs (CPU1-CPU4), a GPU, and a neural network (NN) accelerator. In alternate embodiments, nodes 102a and 102b may include different amount of compute resources. Further, the compute resources may be of different types and/or different designs.

For the illustrated example, during normal operation, node1 102a hosts execution of subsystems/applications (workloads), such as certain in-vehicle entertainment (WE) applications 104a, that are critical, as well as subsystems/applications (workloads), such as other WE applications 106a, that are non-critical. Examples of subsystems/applications (workloads), IVE applications 104a, that are critical may include, but are not limited to, in-vehicle infotainment (IVI): Human Interface and Machine Information (HIMI) (Needles, Telltales etc.), IVI: Vehicle Human Machine Interface (HMI), IVI: Rear View Camera/Surround View, IVI: In-Cabin Monitoring, and so forth. Examples of subsystems/applications (workloads), WE applications 106a that are non-critical may include, but are not limited to, IVI: speech and voice recognition, IVI: software defined radio, IVI: navigation, rear seat entertainment-left (RSE-L) HMI, and so forth. Tasks of the subsystems/applications (workloads), WE applications 104a, that are critical are depicted, in one instance, as being executed in CPU1, CPU2, GPU and NN of compute node 102a, while tasks of subsystems/applications (workloads), WE applications 106a, that are non-critical are depicted, as being executed in CPU2, CPU3, CPU4 and GPU of compute node 102a.

In the case of node2 102b, during normal operation, it likewise hosts execution of some subsystems/applications (workloads), such as Central Vehicle Service (CVS) 104b, that are critical, as well as other subsystems/applications (workloads), e.g., still are IVE applications 106b, that are non-critical. Examples of subsystems/applications (workloads), CVS applications 104b, that are critical include, but are not limited to, security applications (SEC) like vehicle network intrusion detection or vehicle network security gateway, electronic control unit (ecu) body domain, and so forth. Examples of subsystems/applications (workloads), CVS applications 104b, that are critical may also include safety certified software, such as Automotive Safety Integrity Level-B (ASIL-B) certified software for automotive, or CIL-3 certified software for industrial. Examples of subsystems/applications (workloads), WE applications 106b, that are non-critical may include, but are not limited to, RSE-R HMI, RSE-L Movie, RSE-L Game, and so forth. Tasks of the subsystems/applications (workloads), CVS applications 104b, that are critical are depicted, in one instance, as being executed in CPU3, CPU4, and NN of compute node 102b, while tasks of subsystems/applications (workloads), WE applications 106b, that are non-critical are depicted, as being executed in CPU1, CPU2 and GPU of compute node 102b.

In general, for vehicular systems, critical applications/software may be application/software that requires automotive grade silicon, whereas non-critical applications/software may be application/software that requires only consumer grade silicon.

Figure 3:
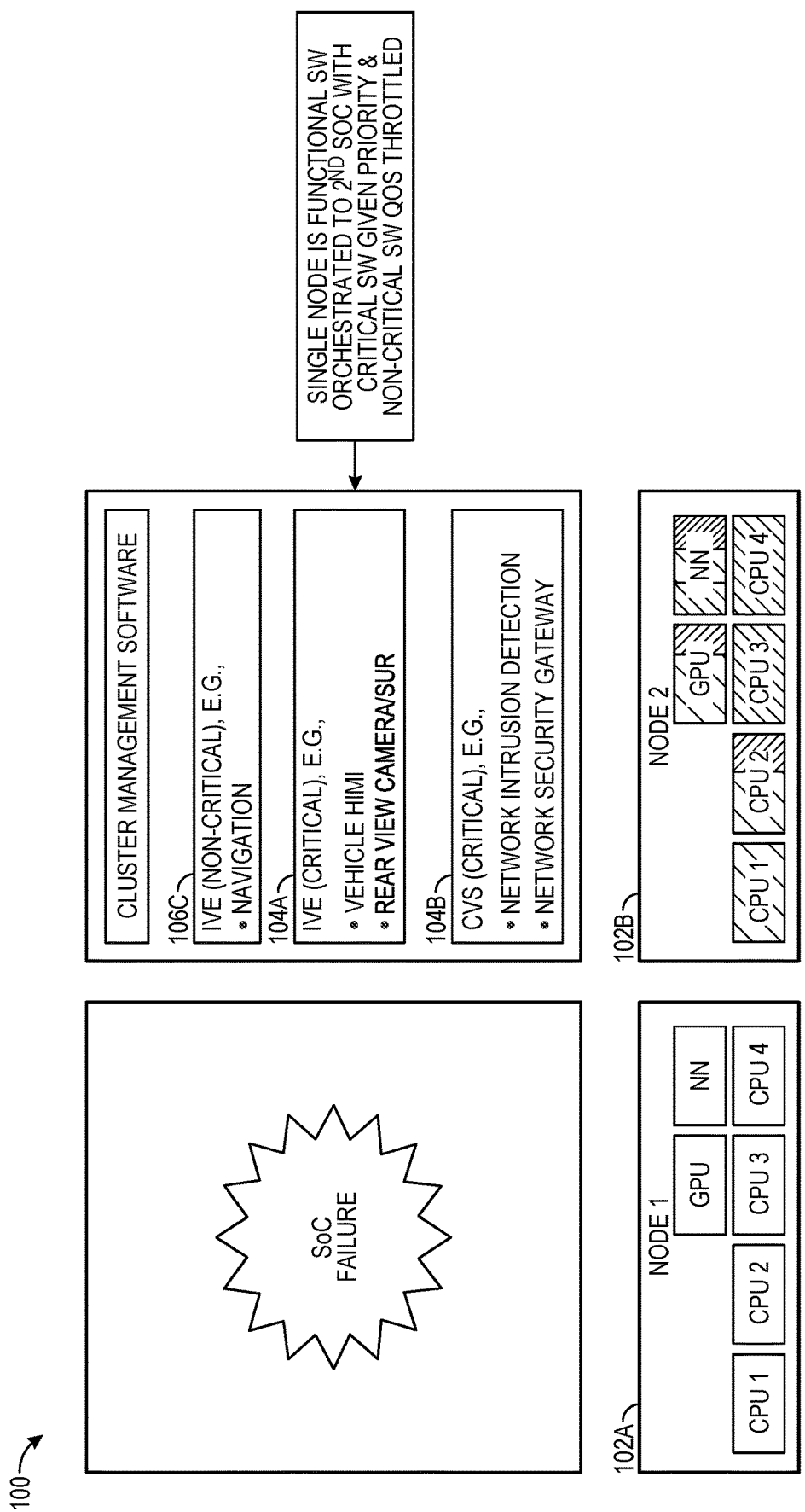
FIG. 3 illustrates example fail-safe operations of the example in-vehicle system of FIG. 1, with one node functional and one node failed, according to various embodiments.

Referring now to FIG. 3, wherein example fail-safe operations of the example in-vehicle system of FIG. 1, with one node functional and one node failed, according to various embodiments, are illustrated. As shown, in an example failure, example IVS 100 may experience failure of node1 102a, rendering its compute resources unavailable. However, node2 102b remains functional with its compute resource available. In an example response, the subsystems/applications (workloads), WE applications 104a, that are critical previously hosted by node1 102a are failed over to execute on node2 102b. Additionally, for the example response, at least one subsystem/application (workload), IVE application 106c, that are non-critical but has higher priority than other user activities, such as navigation, is also failed over to execute on node2 102b. Further, execution of other subsystem/application (workload), WE applications 106a, that are non-critical previously hosted by node1 102a as well as some subsystem/application (workload), WE applications 106b, previously hosted by node2 102b are temporarily halted (not shown in Figure). More specifically, for the example illustration, tasks of the subsystems/applications (workloads), WE applications 104a, that are critical previously hosted by node1 102a are depicted, in one instance, as being executed in CPU1, CPU2, GPU, and NN of compute node 102b. Tasks of the subsystems/applications (workloads), CVS applications 104b, that are critical previously hosted by node2 102b are depicted, as being executed in CPU3, CPU4 and NN of compute node 102b. Tasks of subsystems/applications (workloads), WE applications 106c, that are non-critical previously hosted by node1 102a are depicted, as being executed in CPU2 and GPU of compute node 102b.

Referring now to FIGS. 4-7, wherein an example process for fail-safe operations of the present disclosure, according to various embodiments, is illustrated in further details. More specifically, the example process is illustrated with a non-limiting example embodiment of an IVS having three (3) nodes 402a-402c, each node having one SoCs. The SoCs may be connected over a communications backbone (not shown), allowing the 3 nodes 402a-402c to form a local aggregate compute cluster 400. Additionally, the local compute cluster 400 is to be managed by an orchestration system with each node having an orchestrator 404a-404c, an orchestration agent 406a-406c, a telemetry provider 408a-408c and a container framework 410a-410c. Further, the example sail-safe operation is illustrated with an example failure of node2 402b.

Figure 4:
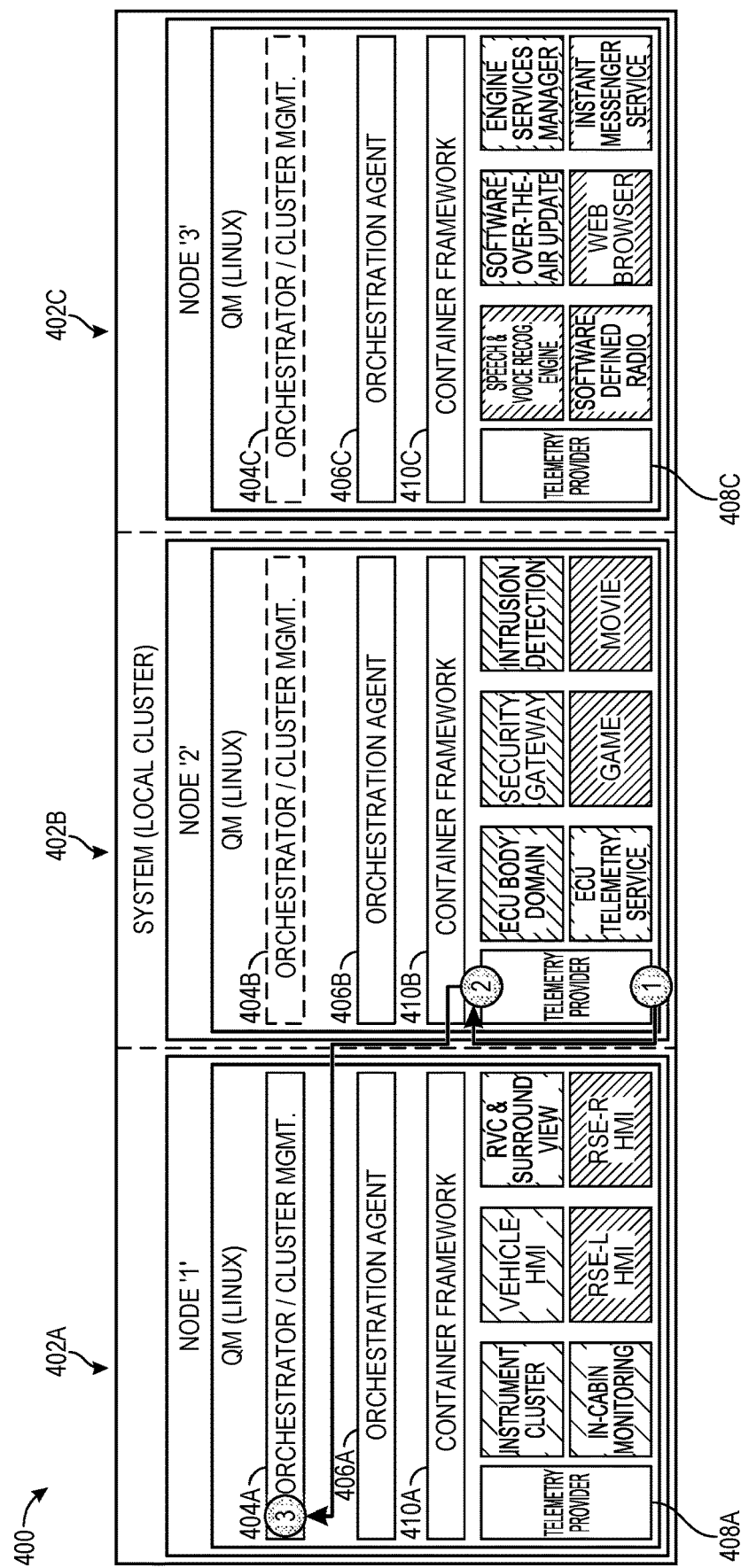
FIGS. 4-7 illustrate an example process for fail-safe operations in further details, according to various embodiments.

Orchestrators 404a-404c: Each orchestrator 404a/404b/404c is a software management component arranged to schedule, deploy and monitor/manage the lifecycle of a set of critical and non-critical software workloads across a local compute cluster, e.g., local cluster 400, in particular, where the critical software workloads will be executed, and what non-critical workloads will be halted, in response to a failure of one of the nodes of the local compute cluster. For example, the orchestrator will decide which node 402a/402b/402c a critical/non-critical grade workload will execute on in the local cluster 400, then send a deployment request to the node's orchestration agent 406a/406b/406c. In various embodiments, one of the orchestrators, e.g. 404a, is selected among the orchestrators 404a-404c of the functioning nodes 402a-402c to perform the cluster management. In FIG. 4, the selected orchestrator 404a is shown with solid lines, while the other orchestrators 404b and 404c are shown with dotted lines, and grayed labels. The orchestration of where the critical software workloads will be executed, and what non-critical workloads will be halted, in response to a failure of one of the nodes of the local compute cluster, may be referred to fail-safe operations in response to the failure of one of the nodes of the local compute cluster. Further, each orchestrator 404a/404b/404c is arranged to transfer the orchestration of the fail-safe operations to another one of the orchestrators in a remaining function node of the local compute cluster, in response to a reporting of an impending failure of its SoC, when serving as the selected orchestrator among the orchestrators. In still other embodiments, the orchestrators 404a-404c of the functioning nodes 402a-402c may jointly perform the cluster management.

Orchestration Agents 406a-406c: Each orchestration agent 406a/406b/406c is a software component that is arranged to be responsible for communicating with the orchestrator 404a/404b/404c. The orchestration agents 406a-406c are the conduits for all communications and actions stemming from the orchestrator in charge, 404a/404b/404c. Example responsibilities include providing real-time telemetry regarding system resource utilization on the node it runs on, deploying/initializing workloads, halting workloads, etc. In various embodiments, the communications between the selected orchestrator 404a/404b/404c and the orchestration agents 406a-404c may be in accordance with any inter-process communication protocol known in the art.

Telemetry Providers 408a-408c: Each telemetry provider 408a/408b/408c is a software component that is responsible for collecting real-time telemetry (CPU utilization, GPU utilization, memory utilization, etc.) as well as collecting system operational status (has the node failed in any way). The telemetry providers 408a-408c are arranged to report the real-time telemetry and system operational states to the selected orchestrator 404a-404c in control. In various embodiments, the telemetry providers 408a-408c report the real-time telemetry and system operational states to the selected orchestrator 404a-404c in control, via the corresponding orchestration agents 406a-406c. In various embodiments, the communications between the telemetry providers 408a-408c and the orchestration agents 406a-404c may be likewise in accordance with any inter-process communication protocol known in the art.

Container Frameworks 410a-410c: Each container framework 410a/410b/410c is a software framework responsible for providing packaging and basic execution and memory access permissions (relative to the operating system, enabling the software and all of its dependencies to be met and validated without requiring knowledge of any other (containerized) software running on the system. This is a base building block of a software orchestration system, as for the illustrated embodiments, the orchestrator is arranged to deploy containerized applications, not native applications.

FIG. 4 illustrates the first three stages of the example process for fail-safe operations. At stage 1, telemetry provider 408*b* on node2 402*b* detects an unrecoverable system failure requiring the entire node 402*b* to be permanently halted (shut down). At stage 2, telemetry provider 408*b* informs node2's orchestration agent 406*b* of this failure. At stage 3, orchestration agent 406*b* on node2 402*b* informs the orchestrator in charge, for this example, orchestrator 404*a* on node1 402*a* of this failure (i.e. the failure of node2 402*b*).

Figure 5:
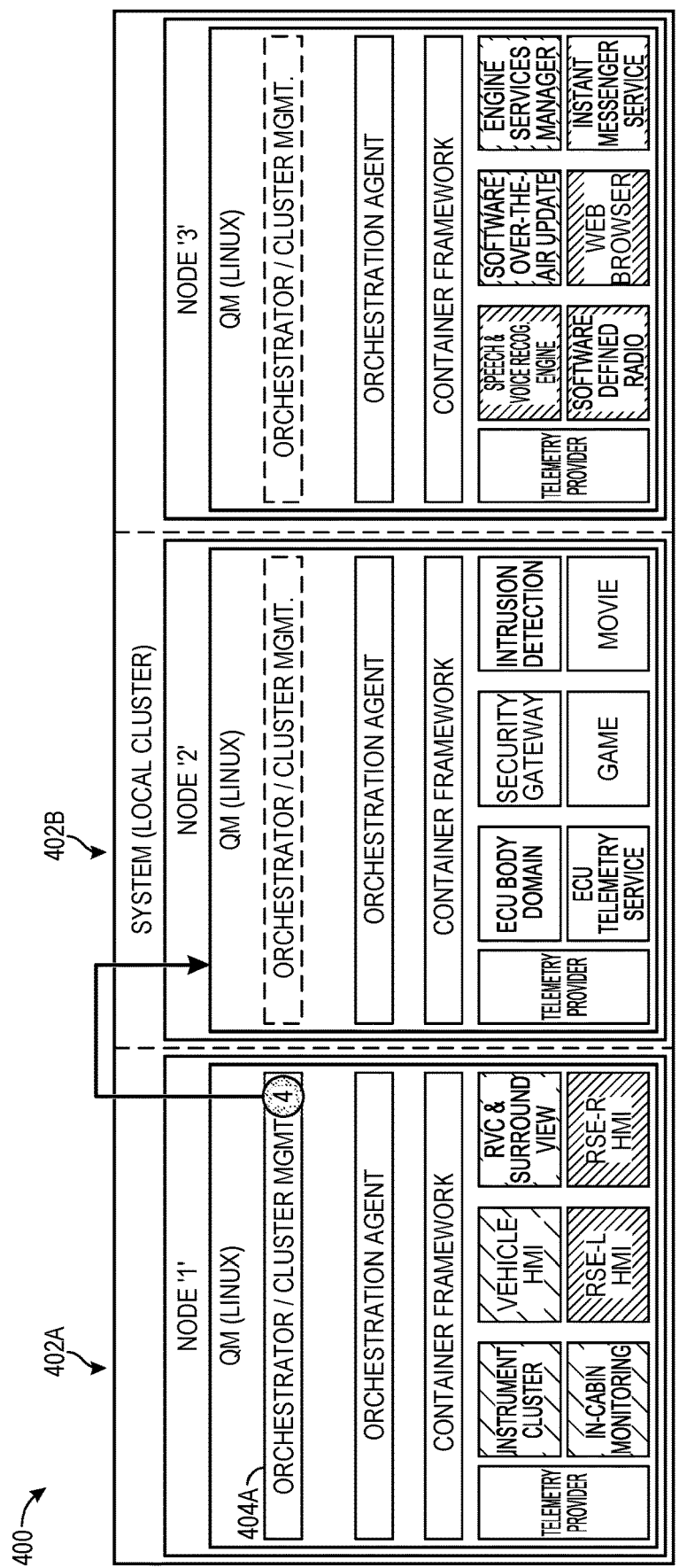

FIG. 5 illustrates the next stage of the example process for fail-safe operations. At stage 4, the orchestrator in charge, i.e. orchestrator 404*a* on node1 402*a* removes node2 402*b* from the local compute cluster 400, as depicted in FIG. 5 by the graying out of node 2 402*b*.

Figure 6:
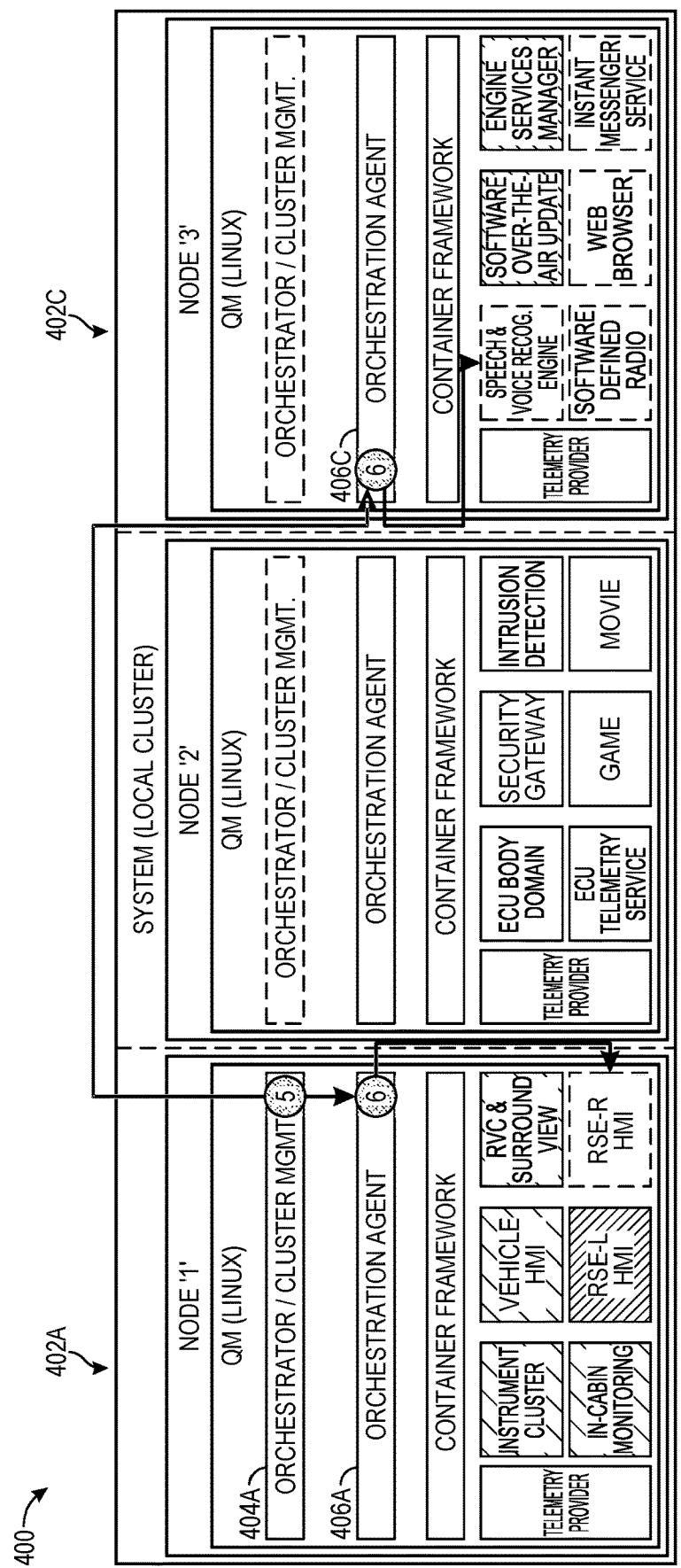

FIG. 6 illustrates the next two stages of the example process for fail-safe operations. At stage 5, the orchestrator in charge, i.e. orchestrator 404*a* on node1 402*a* instructs orchestration agents 406*a* and 406*c* of functioning nodes 402*a* and 402*c* across the local compute cluster 400 to halt a specified set of non-critical grade software, to free up or lighten the load of various computing resources, such as CPU, GPU and/or NN in remaining function nodes 402*a* and 402*c*. At stage 6, the various orchestration agents 406*a* and 406*c* halt the requested set of workloads, freeing up or lightening the load of various computing resources, such as CPU, GPU and/or NN in remaining function nodes 402*a* and 402*c*.

Figure 7:
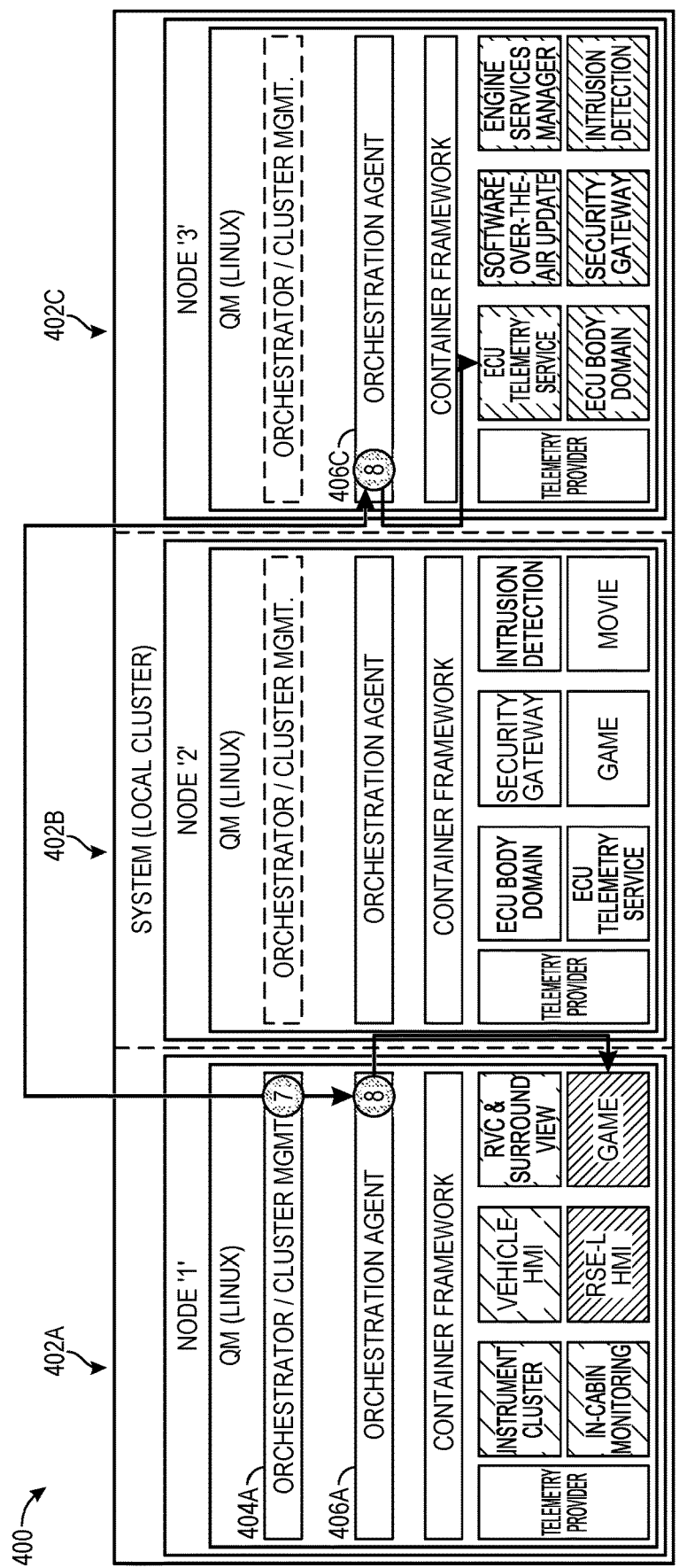

FIG. 7 illustrates the next two stages of the example process for fail-safe operations. At stage 7, the orchestrator in charge, e.g., orchestrator 404*a* on node1 402*a* instructs orchestration agents 406*a* and 406*c* of remaining functioning nodes 402*a* and 402*c* across the compute cluster 400 to deploy a specified set of critical software. At stage 8, the orchestration agents 406*a* and 406*c* in the various remaining nodes 402*a* and 402*c* launch the requested set of critical workloads.

Outcome: Accordingly, the IVI System is able to achieve fully featured and fully operation set of critical applications/services, post-failure of one of its compute nodes of a local compute cluster.

In various embodiments, if the orchestrator in charge is situated in the failing node, the system orchestration responsibility may be transferred to another orchestrator on a functioning node before the above described fail-safe operations commence. In alternate embodiments, a local compute cluster may have more or less compute nodes. Similarly, in various embodiments, an IVI system may have one or more local compute nodes.

In various embodiments, detection of system failure can be implemented in the orchestrator, a separate watchdog service, or in an external device (firmware on that device). In various embodiments, in lieu of having full dynamic orchestration of what and where all critical and non-critical software are executed or halted, all critical software may be statically mapped with respect to whether they will run in both nominal and failure cases, and only the halting and location of execution of the non-critical software are dynamically orchestrated to execute in remaining fully or partially operational silicon for various failure cases. In still other embodiments, all critical software may be statically mapped with respect to whether they will run in both nominal and failure cases, and by default, execution of the non-critical software are halted, and not executed in any of the remaining fully or partially operational silicon, for various failure cases.

Figure 8:
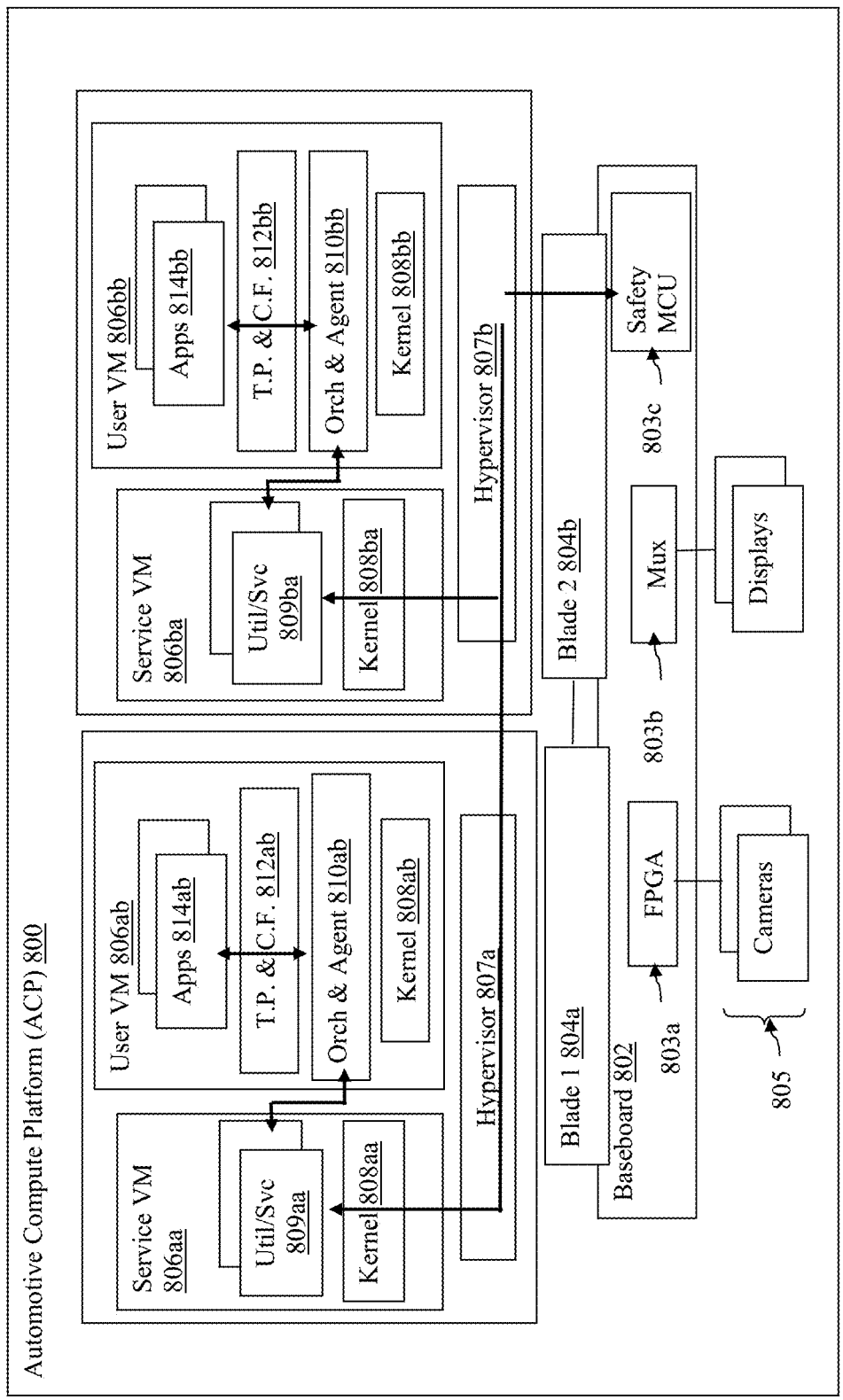
FIG. 8 illustrates an example computing platform suitable for use to practice aspects of the present disclosure, according to various embodiments.

FIG. 8 illustrates an example automotive computing platform that may be suitable for use to practice selected aspects of the present disclosure. As shown, computing platform 800 may include a baseboard 802 having a number of computing blades 804*a*-804*b* and input devices 805 (such as cameras and displays). Baseboard 802 may also include FPGA 803*a* multiplexors 803*b*, safety micro control unit (MCU) 803*c* and other hardware components. FPGA 803*a* may be arranged to serve as the interface for input devices such as cameras, and multiplexors 803*b* may be arranged to multiplex display outputs to the various displays. Safety MCU 803*c* may be arranged to configure FPGA 803*a* and multiplexors 803*b*, as well as placing various software in the system in a failure state. Each computing blade 804*a*/804*b* includes one or more SoCs (not shown) forming a local compute cluster. Each SoC may include one or more CPUs, GPUs, CV/DV or other accelerators, and read-only memory (ROM) (not shown). The CPUs, GPUs and CV/DL accelerators may be any one of a number of CPUs, GPUs and accelerators known in the art. Similarly, the ROM may be any one of a number of ROM known in the art. Additionally, each computing blade 804*a*/804*b* may also include system memory (not shown), which may likewise be any one of a number of volatile storage known in the art.

Additionally, each computing blade 804*a*/804*b* may include a hypervisor 806*a*/806*b* hosting a number of virtual machines (VM), e.g., a service VM 806*aa*/806*ba* and one or more user VM 806*ab*/806*bb*. Each service VM 806*aa*/806*ba* may include a kernel 808*aa*/808*ba* and a plurality of utilities/services (util/svc) 809*aa*/809*ba*. Each user VM 806*ab*/806*bb* may include a kernel 808*ab*/808*bb*, an orchestrator (orch) and its agent 810*ab*/810*bb*, a telemetry provider and its companion container framework (T.P. & C.F.) 812*ab*/812*bb*, and a plurality of applications (apps) 814*ab*/814*bb*.

Hypervisor 807*a*/807*b* may be any one of a number of hypervisors known in the art, e.g., an ACRN hypervisor. Kernels 808*aa*, 808*ab*, 808*ba* and 808*bb* may likewise be any one of a number of kernels of operation systems (OS) known in the art. For example, kernels 808*aa*/808*ba* may be the kernel of the real time OS Zephyr, and kernels 808*ab* and 808*bb* may be the kernels of the OS Linux. Utilities/services 809*aa*/809*ba* may each include one or more services dedicated to facilitate cooperation between hypervisor 807*a*/807*b* and orchestrator/agent 810*ab*/810*bb* to practice the earlier described fail-safe operation methods of the present disclosure.

Orchestrator and agent 810*ab*/810*bb* may be the orchestrators 404*a*-404*c* and orchestration agents 406*a*-406*c* of FIGS. 4-7, incorporated with the fail-safe technology of the present disclosure earlier described. Similarly, telemetry provider and container framework may telemetry provider 408*a*-408*c* and container provider 410*a*-410 of FIGS. 4-7 incorporated with the fail-safe technology of the present disclosure earlier described.

Examples of utilities/services 809*aa*/809*ba* may include any critical applications, such as critical applications 104*a* and 104*b* of FIGS. 1 & 2, earlier described. That is, utilities/services 809*aa*/809*ba* may include, but are not limited to, in-vehicle instrumentation (IVI): Human Interface and Machine Information (HIMI) (Needles, Telltales etc.), IVI: Vehicle Human Machine Interface (HMI), IVI: Rear View Camera/Surround View, IVI: In-Cabin Monitoring, security applications (SEC) like vehicle network intrusion detection or vehicle network security gateway, electronic control unit (ecu) body domain and so forth. In various embodiments, utilities/services 809*aa*/809*ba* includes a service arranged to place orchestrators 808*ab*/808*bb* in a failure state.

Applications 814*ab* and 814*bb* may be any non-critical applications, such as non-critical applications 106*a*-106*b* of FIGS. 1 and 2, earlier described. That is, non-critical applications 814*ab* and 814*bb* may include, but are not limited to, IVI: speech and voice recognition, IVI: software defined radio, IVI: navigation, rear seat entertainment-left (RSE-L) HMI, RSE-R HMI, RSE-L Movie, RSE-L Game, and so forth.

Additionally, computing platform 800 may include persistent storage devices (not shown). Example of persistent storage devices may include, but are not limited to, flash drives, hard drives, compact disc read-only memory (CD-ROM) and so forth. Further, computing platform 800 may include input/output devices 805 (such as cameras, displays, keyboard, cursor control and so forth) and communication interfaces (not shown) (such as network interface cards, modems and so forth). The elements may be coupled to each other via one or more system buses (not shown).

Each of these elements may perform its conventional functions known in the art. In particular, the system memory and mass storage devices may be employed to store a working copy and a permanent copy of the programming instructions implementing the operations associated with the OSes, the container frameworks, the telemetry provider, the orchestrator and/or the orchestration agents. The various elements may be implemented by assembler instructions supported by the CPUs/GPUs or high-level languages, such as, for example, C, that can be compiled into such instructions.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium.

Figure 9:
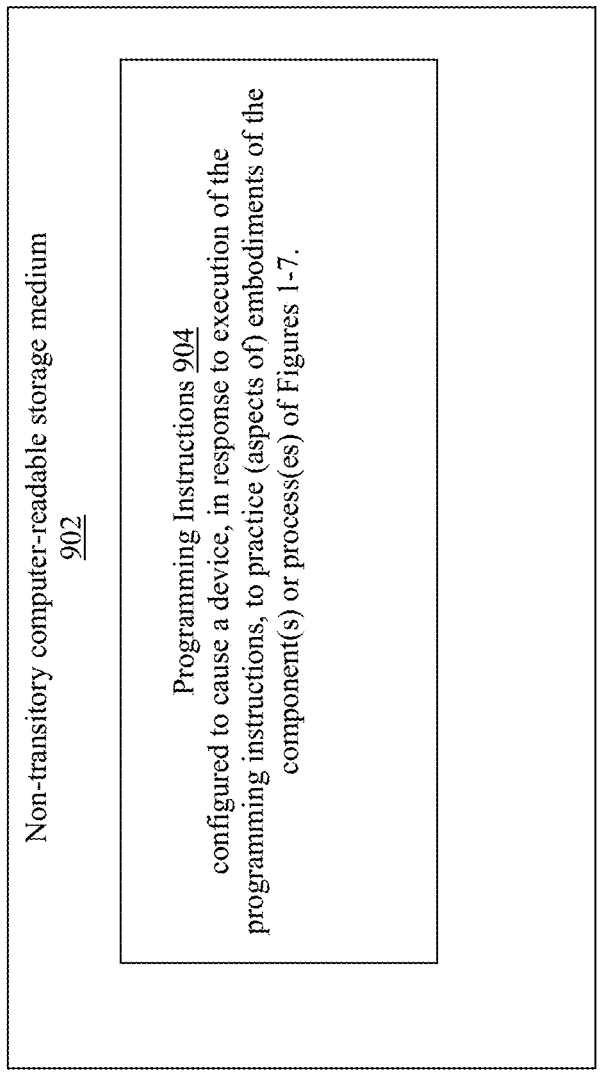
FIG. 9 illustrates a storage medium having instructions for practicing methods described with references to preceding Figures, according to various embodiments.

FIG. 9 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 902 may include a number of programming instructions 904. Programming instructions 904 may be configured to enable a device, e.g., computing platform 800, in response to execution of the programming instructions, to implement (aspects of) the hypervisor, the operating systems, the container frameworks, the telemetry provider, the orchestrator and/or the orchestration agents. In alternate embodiments, programming instructions 904 may be disposed on multiple computer-readable non-transitory storage media 902 instead. In still other embodiments, programming instructions 904 may be disposed on computer-readable transitory storage media 1002, such as, signals.

Thus, embodiments of method and apparatus to provide an improved fail-safe system for automobiles, by classifying and prioritizing workloads across a local compute cluster have been described. The embodiments may have the following advantages:

Ability to Utilize Consumer Grade DPM Silicon in Automotive: Enables an original equipment manufacturer (OEM) to ship and higher DPM silicon solutions (cheaper) without relaxing fail-safe operations nor fail-safe workload fidelity.

Fundamentally Aligns to a System Consolidation Strategy and Architecture: As system consolidation occurs across the industry, computing power needs are skyrocketing, and multi-SoC designs are starting to be a hot discussion topic as single SoC solutions are seemingly less feasible, especially with automotive grade and/or automotive DPM SoC consolidation of this type spans both automotive and consumer electronics classifications of software. The present disclosure enables an OEM to achieve the best of both worlds (bleeding edge SoC performance combined with extremely low DPM targets for segments like automotive).

Increased Non-Failure Mode System Scalability: Removes the need to pay for fail-safe (backup) compute nodes (ECU, etc) who's sole purpose in the architecture is to operate if and only if the primary compute node fails. In a legacy fail-safe architecture, the primary system is unable to utilize the compute power of the primary solution while the system is operating normally (not in failed state). The present disclosure allows for the system to use both nodes during normal operation, and the non-failed (and/or partially failed) node(s) during a failure mode.

Example embodiments described include:

Example 1 is an apparatus for embedded computing, comprising: a plurality of system-on-chips (SoCs) forming a local compute cluster of an embedded computing system; and an orchestrator disposed on one of the SoCs to orchestrate fail-safe operations, in response to a reported unrecoverable failure requiring shut down or partial disabling of one of the SoCs, to consolidate execution of critical workloads on one or more of remaining fully or partially operational ones of the SoCs. The one or more remaining fully or partially operational SoCs may or may not include the one SoC the orchestrator is disposed on.

Example 2 is example 1, wherein the orchestrator is further arranged to orchestrate the fail-safe operations to consolidate execution of selected non-critical workloads on the one or more of the remaining fully or partially operational ones of the SoCs, and to halt execution of other non-critical workloads on the one or more of the remaining fully or partially operational ones of the SoCs.

Example 3 is example 2, further comprising a plurality of orchestration agents correspondingly disposed in the SoCs to communicate with the orchestrator to facilitate the orchestrator in scheduling execution of the critical workloads and the selected non-critical workloads on the one or more of the remaining fully or partially operational ones of the SoCs, and halting execution of the other non-critical workloads on the one or more of the remaining fully or partially operational ones of the SoCs.

Example 4 is example 3, further comprising a plurality of telemetry providers correspondingly disposed on the plurality of SoCs to collect and report real time operational states and resource utilizations of the corresponding SoCs, through the corresponding orchestration agents, to the orchestrator.

Example 5 is example 2, wherein to consolidate execution of selected non-critical workloads on the one or more of the remaining fully or partially operational ones of the SoCs comprises to consolidate execution of one or more of a vehicle rear view camera or surround view application, a vehicle in-cabin monitoring application, a vehicle network intrusion detection application, a vehicle human machine interface, a vehicle network security gateway or a body domain electronic control unit.

Example 6 is example 2, wherein to consolidate execution of selected non-critical workloads on the one or more of the remaining fully or partially operational ones of the SoCs comprises consolidate execution of at least a vehicle navigation application on one of the one or more of the remaining fully or partially operational ones of the SoCs.

Example 7 is example 2, wherein to halt execution of other non-critical workloads on the one or more of the remaining fully or partially operational ones of the SoCs comprises to halt execution of a speech and voice recognition application, a software defined radio application, or a rear seat entertainment application on the one or more of the remaining fully or partially operational ones of the SoCs.

Example 8 is example 1, further comprising a plurality of telemetry providers correspondingly disposed on the plurality of SoCs to collect and report real time operational states and resource utilizations of the corresponding SoCs to the orchestrator.

Example 9 is example 1, wherein each SoC includes one or more central processing units (CPUs), and at least a selected one of a graphics processing unit (GPU) or a neural network accelerator (NN).

Example 10 is example 9, further comprising a plurality of telemetry providers correspondingly disposed on the plurality of SoCs to collect and report real time operational states and resource utilizations of the CPUs and the at least selected one of the GPU or NN of the corresponding SoCs to the orchestrator.

Example 11 is example 1, further comprising a plurality of container frameworks correspondingly disposed at the plurality of SoCs to provide packaging and execution permissions, enabling the critical workloads and their dependencies to be met and validated without requiring knowledge of any other software running on the embedded computing system.

Example 12 is example 1, wherein the apparatus comprises a plurality of orchestrators respectively disposed at the plurality of SoCs arranged to elect one of the plurality of orchestrators to serve as the orchestrator disposed on one of the SoCs arranged to orchestrate the fail-safe operations.

Example 13 is example 11, wherein the orchestrator disposed on one of the SoCs arranged to orchestrate the fail-safe operations is further arranged to transfer the orchestration of the fail-safe operations to another one of the orchestrators, when the reported unrecoverable failure requiring shut down is associated with the orchestrator's SoC.

Example 14 is example 1, wherein the plurality of SoCs comprise consumer grade silicon.

Example 15 is a method for embedded computing, comprising: executing a plurality of critical workloads and a plurality of non-critical on a plurality of system-on-chips (SoCs) of a local compute cluster of an embedded computing platform; and in response to detection of an unrecoverable failure requiring shut down or partial disabling of one of the plurality of SoCs, performing fail-safe operations to halt execution of at least some of the non-critical workloads, and consolidate execution of the critical workloads on one or more of remaining fully or partially functional ones of the SoCs.

Example 16 is example 15 wherein performing fail-safe operations further comprise performing fail-safe operations to consolidate execution of some, but not all, of the non-critical workloads on the one or more of the remaining fully or partially functional ones of the SoC.

Example 17 is example 15, further comprising collecting and reporting real time operational states and resource utilizations of the corresponding SoCs.

Example 18 is example 15, wherein each of the SOCs include an orchestrator arranged to perform the fail-safe operations, wherein the method further comprises electing one of the orchestrators, among the plurality of orchestrators, to perform the fail-safe operation, in response to the detecting of the unrecoverable failure requiring shutting down of one of the plurality of SoCs.

Example 19 is example 18, further comprising transferring the orchestration of the fail-safe operations to respond to the detecting of the unrecoverable failure requiring shutting down of one of the plurality of SoCs, to another one of the orchestrators, when the reporting of the detecting of the unrecoverable failure requiring shutting down of one of the SoCs is associated with of the orchestrator's SoC.

Example 20 is at least one computer-readable medium (CRM) having instructions stored therein, to cause a local compute cluster of an embedded computing platform of embedded system, in response to execution of the instructions by a processor of one of a plurality of system-on-chips (SoCs) of the embedded computing platform, to implement an orchestrator to orchestrate fail-safe operations, in response to a reporting of an unrecoverable failure requiring shut down or partial disabling of one of the SoCs, to consolidate execution of critical workloads on one or more of remaining fully or partially operational ones of the SoCs.

Example 21 is example 20, wherein the orchestrator is to further orchestrate the fail-safe operations to consolidate execution of selected non-critical workloads on the one or more of the remaining fully or partially operational ones of the SoCs, and to halt execution of other non-critical workloads on the one or more of the remaining fully or partially operational ones of the SoCs.

Example 22 is example 21, wherein the local compute cluster is further caused to implement a plurality of orchestration agents corresponding disposed in the SoCs to communicate with the orchestrator to facilitate the orchestrator in scheduling execution of the critical workloads and the selected non-critical workloads on the one or more of the remaining fully or partially operational ones of the SoCs, and halting execution of the other non-critical workloads on the one or more of the remaining fully or partially operational ones of the SoCs.

Example 23 is example 22, wherein the local compute cluster is further caused to implement a plurality of telemetry providers corresponding disposed in the SoCs to collect and report real time operational states and resource utilizations of the corresponding SoCs, through the corresponding orchestration agents, to the orchestrator.

Example 24 is example 20, wherein the local compute cluster is caused to implement a plurality of orchestrators respectively disposed at the plurality of SoCs, and the plurality of orchestrators are arranged to elect one of the plurality of orchestrators to serve as the orchestrator to orchestrate the fail-safe operations, in response to the reporting of an unrecoverable failure requiring shut down of one of the SoCs, to consolidate execution of critical workloads on the one or more of the remaining fully or partially operational ones of the SoCs.

Example 25 is example 24, wherein the orchestrator disposed on one of the SoCs arranged to orchestrate the fail-safe operations is further arranged to transfer the orchestration of the fail-safe operations to another one of the orchestrators, when the reported unrecoverable failure requiring shut down is associated with the orchestrator's SoC.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A compute cluster of a computer-assisted or autonomous driving (CA/AD) vehicle, wherein the compute cluster is formed of a set of compute nodes and comprises:
   a first compute node that implements:
      first critical workloads related to operation of the CA/AD vehicle; and
      first non-critical workloads of the CA/AD vehicle, wherein the first non-critical workloads have a first priority;
   a second compute node that implements:
      second critical workloads of the CA/AD vehicle; and
      second non-critical workloads of the CA/AD vehicle, wherein the second non-critical workloads have a second priority lower than the first priority; and
   at least one compute node that implements an orchestrator, wherein the orchestrator is, in response to a failure-related indication related to the first compute node, to:
      halt execution of the second non-critical workloads on the second compute node; and
      consolidate execution of the first critical workloads, the first non-critical workloads, and the second critical workloads on the second compute node when the second compute node is fully or partially operational;
   wherein the orchestrator is to consolidate the first non-critical workloads on the second compute node based on the first priority being higher than the second priority.

2. The compute cluster of claim 1, wherein individual compute nodes in the set of compute nodes implement respective orchestration agents, and the respective orchestration agents are to communicate with the orchestrator to facilitate the orchestrator in scheduling execution of the first critical workloads and the first non-critical workloads on the second compute node, and halting execution of the second non-critical workloads on the second compute node.

3. The compute cluster of claim 2, wherein the individual compute nodes implement respective telemetry providers, and the respective telemetry providers are to collect and report, to the orchestrator via the respective orchestration agents, real time operational states and resource utilizations of the individual compute nodes on which they operate.

4. The compute cluster of claim 1, wherein the first non-critical workloads include one or more of infotainment workloads, gaming workloads, speech and voice recognition workloads, software defined radio workloads, navigation workloads, and messaging service workloads.

5. The compute cluster of claim 1, wherein the first critical workloads include one or more of instrument cluster workloads, infotainment subsystem workloads, sensor workloads, user monitoring workloads, network intrusion detection workloads, human machine interface workloads, a network security gateway workloads, electronic control unit (ECU) body domain workloads, ECU telemetry service workloads, over-the-air update service workloads, machine learning workloads, and autonomous control workloads.

6. The compute cluster of claim 1, wherein the set of compute nodes implement respective telemetry providers, and the respective telemetry providers are to collect and report, to the orchestrator, real time operational states and resource utilizations of individual components of corresponding compute nodes.

7. The compute cluster of claim 1, wherein the first compute node includes one or more central processing units (CPUs) and special-purpose processing circuitry, at least some of the first critical workloads are operated by the special-purpose processing circuitry, and the special-purpose processing circuitry includes at least one of at least one graphics processing unit (GPU) and at least one neural network (NN) accelerator.

8. The compute cluster of claim 1, wherein the second compute node includes one or more CPUs and special-purpose processing circuitry, at least some of the second critical workloads or at least some of the consolidated first critical workloads are operated by the special-purpose processing circuitry, and the special-purpose processing circuitry includes at least one of at least one graphics processing unit (GPU) and at least one neural network (NN) accelerator.

9. The compute cluster of claim 1, wherein individual compute nodes in the set of compute nodes implement respective container frameworks, and the respective container frameworks are to provide packaging and execution permissions to enable the critical workloads and their dependencies to be met and validated without requiring knowledge of any other software running on the embedded computing system.

10. The compute cluster of claim 1, wherein the orchestrator operated by the at least one compute node is a first orchestrator and individual compute nodes in the set of compute nodes implement respective orchestrators, and the respective orchestrators are to:
   elect the first orchestrator to serve as a cluster manager for the compute cluster; and
   transfer the orchestration of the fail-safe operations to another orchestrator of the respective orchestrators when the report is associated with the at least one compute node or when the at least one compute node is the first compute node.

11. The compute cluster of claim 1, wherein the at least one compute node is the second compute node or another compute node in the set of compute nodes that is different than the first and second compute nodes.

12. The compute cluster of claim 1, wherein the first critical workloads and the second critical workloads relate to safety functions of the CA/AD vehicle, and the first non-critical workloads and the second non-critical workloads relate to infotainment or media functions of the CA/AD vehicle.

13. The compute cluster of claim 1, wherein the first critical workloads and the second critical workloads relate to an instrument cluster of the CA/AD vehicle, and the first non-critical workloads and the second non-critical workloads relate to infotainment or media functions of the CA/AD vehicle.

14. A method for operating an orchestrator of an embedded computing platform of a computer-assisted or autonomous drive (CA/AD) vehicle, wherein the embedded computing platform comprises a set of compute nodes, the method comprising:
    executing first critical workloads of the CA/AD vehicle and first non-critical workloads of the CA/AD vehicle on a first compute node in the set of compute nodes;
    executing second critical workloads of the CA/AD vehicle and second non-critical workloads of the CA/AD vehicle on a second compute node in the set of compute nodes, wherein the second critical workloads are different than the first critical workloads, and wherein the first non-critical workloads have a first priority that is higher than a second priority of the second non-critical workloads; and
    performing, in response to a failure-related indication related to the first compute node, operations including:
        halting execution of at least some of the second non-critical workloads executing on the second compute node when the second compute node is fully or partially functional; and
        consolidating execution of the first critical workloads, the first non-critical workloads, and the second critical workloads on the second compute node, wherein consolidation of the first non-critical workloads on the second compute node is based on the first priority being higher than the second priority.

15. The method of claim 14, further comprising:
    collecting reports of real time operational states and resource utilizations from corresponding compute nodes in the set of compute nodes.

16. The method of claim 14, wherein each compute node of the set of compute nodes includes an orchestrator arranged to perform the fail-safe operations, wherein the method further comprises:
    electing one of the orchestrators among the set of compute nodes to perform the fail-safe operation in response to the detection of the unrecoverable failure requiring shut down or partial disabling of the at least one compute node.

17. The method of claim 16, further comprising:
    transferring, to another one of the orchestrators, the orchestration of the fail-safe operations to respond to the detection of the unrecoverable failure requiring shut down or partial disabling of the at least one compute node when the reporting of the detection is associated with a compute node of the elected one of the orchestrators.

18. The method of claim 14, wherein the first critical workloads and the second critical workloads relate to an instrument cluster of the CA/AD vehicle or a safety operation of the CA/AD vehicle, and the first non-critical workloads and the second non-critical workloads relate to infotainment or media functions of the CA/AD vehicle.

19. One or more non-transitory computer-readable media comprising instructions that, upon execution of the instructions by one or more elements of logic, are to cause a set of compute nodes of a computer-assisted or autonomous driving (CA/AD) vehicle to:
    execute first critical workloads of the CAD/AD vehicle and first non-critical workloads of the CA/AD vehicle on a first compute node in the set of compute nodes;
    execute second critical workloads of the CA/AD vehicle and second non-critical workloads of the CA/AD vehicle on a second compute node in the set of compute nodes, wherein the second critical workloads are different than the first critical workloads and wherein the first non-critical workloads have a first priority that is higher than a second priority of the second non-critical workloads; and
    perform, in response to a failure-related indication related to the first compute node, operations including:
        halting execution of at least some of the second non-critical workloads executing on the second compute node when the second compute node is fully or partially functional, and
        consolidating execution of the first critical workloads, the first non-critical workloads, and the second critical workloads on the second compute node,
        wherein the consolidation of the first non-critical workloads on the second compute node is based on the first priority being higher than the second priority.

20. The one or more non-transitory computer-readable media of claim 19, wherein the instructions are further to:
    collect reports of real time operational states and resource utilizations from corresponding compute nodes in the set of compute nodes.

21. The one or more non-transitory computer-readable media of claim 19, wherein respective compute nodes of the set of compute nodes include an orchestrator arranged to perform the fail-safe operations, and wherein the instructions are further to:
    elect one of the orchestrators among the set of compute nodes to perform the fail-safe operation in response to the detection of the unrecoverable failure requiring shut down or partial disabling of the at least one compute node.

22. The one or more non-transitory computer-readable media of claim 21, wherein the instructions are further to:
    transfer, to another one of the orchestrators, the orchestration of the fail-safe operations to respond to the detection of the unrecoverable failure requiring shut down or partial disabling of the at least one compute node when the reporting of the detection is associated with a compute node of the elected one of the orchestrators.

23. The one or more non-transitory computer-readable media of claim 19, wherein the first critical workloads and the second critical workloads relate to an instrument cluster of the CA/AD vehicle or a safety operation of the CA/AD vehicle, and the first non-critical workloads and the second non-critical workloads relate to infotainment or media functions of the CA/AD vehicle.

24. The compute cluster of claim 1, wherein the failure-related indication is related to a failure or impending failure of the first compute node.

\* \* \* \* \*